United States Patent Office 3,403,875
Patented Oct. 1, 1968

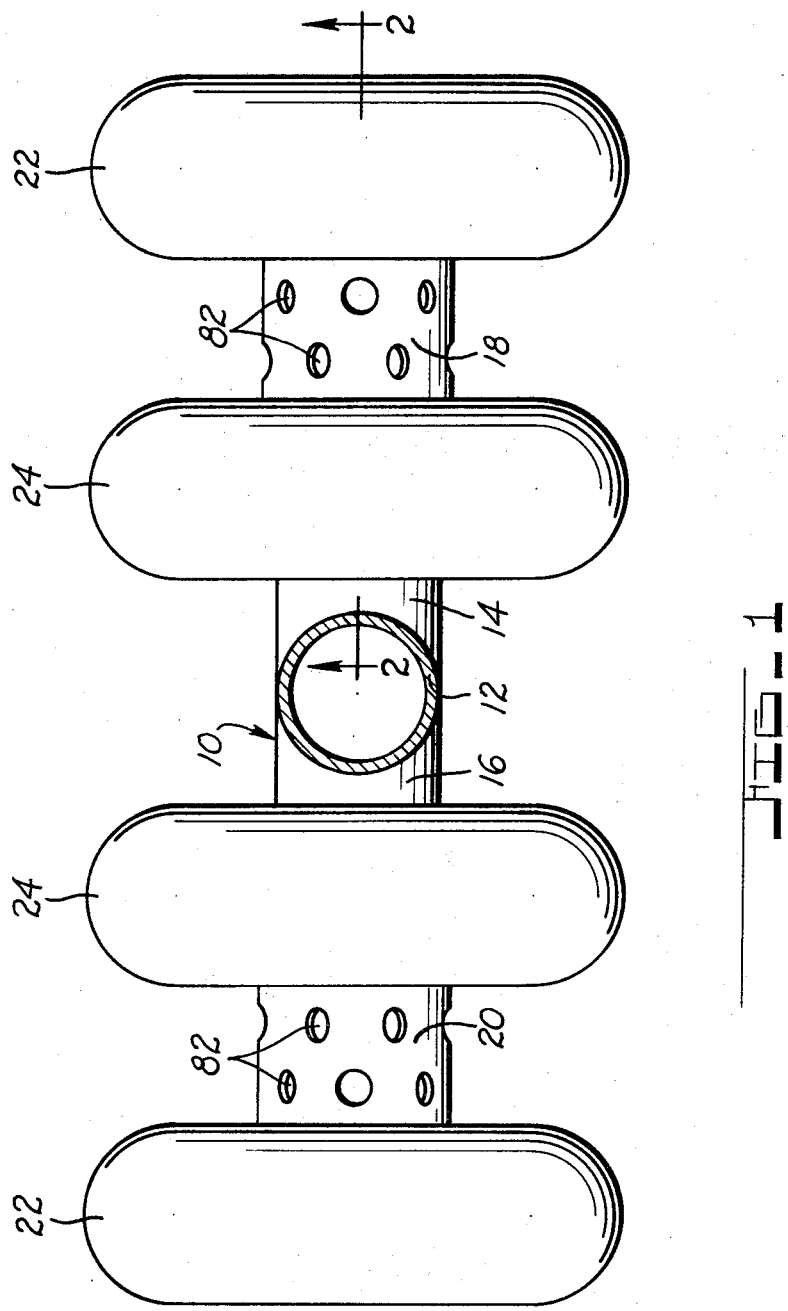

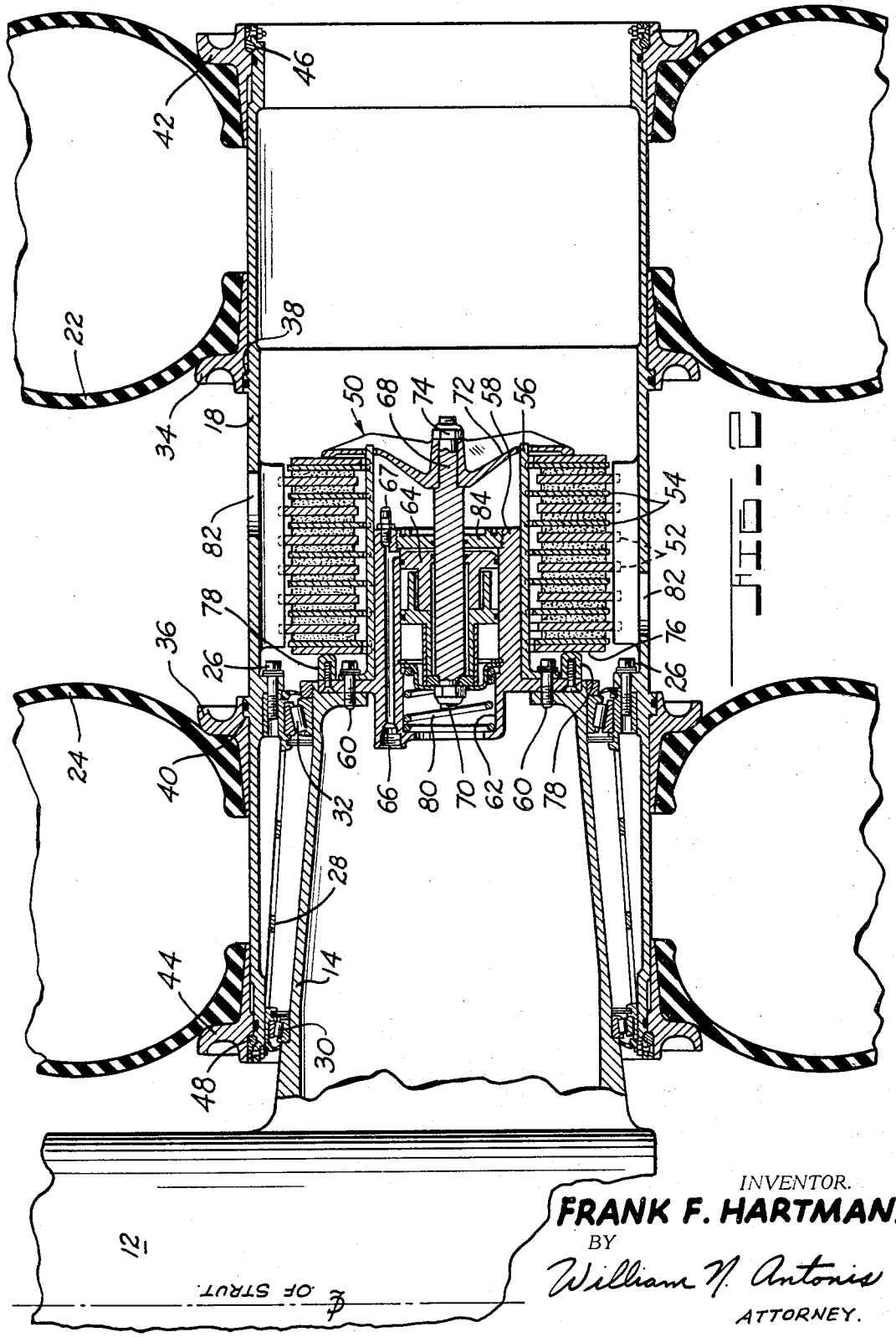

3,403,875
DUAL TIRE WHEEL AND BRAKE ASSEMBLY
Frank Felix Hartman, South Bend, Ind., assignor to The Bendix Corporation, a corporation of Delaware
Filed May 9, 1966, Ser. No. 548,549
6 Claims. (Cl. 244—111)

ABSTRACT OF THE DISCLOSURE

The following relates to a dual tire wheel and brake assembly wherein a hollow cylindrical wheel is removably secured to a support drum through a plurality of bolts so that the wheel can be removed from the strut axle without disturbing the bearings located between the axle and the support drum and without disturbing the brake mechanism which is mounted on the outer end of the axle. Conversely, servicing of the brake can be accomplished without disturbing the wheel.

---

One of the objects of this invention is to provide an aircraft landing gear which includes a single hollow cylindrical wheel suitably attached to the strut axle for mounting a pair of tires and a brake mechanism located within the hollow cylindrical wheel and suitably connected to the axle.

Another object of this invention is to provide an aircraft landing gear of the foregoing type wherein the dual tire cylindrical wheel can be removed from the axle without disturbing the brake mechanism.

A further object of this invention is to provide an aircraft landing gear of the type described which includes a wheel support drum surrounding the strut axle with the bearings between the drum and axle so that the wheel can be removed without disturbing the bearings.

A still further object of this invention is to provide a dual tire cylindrical wheel for a landing gear of the type described which includes removable tire retaining flanges which permit changing either one of the tires without disturbing the other.

Another object of this invention is to provide a landing gear of the type described wherein the dual tire hollow cylindrical wheel includes a plurality of holes located around the periphery thereof and between the tires for ventilating and cooling the brake mechanism.

A further object of this invention is to provide a landing gear of the type described wherein the brake mechanism, which is mounted within the hollow cylindrical wheel, is actuated by a single centrally located hydraulic piston and is arranged in a manner which permits brake servicing of the heat sink components (rotors, stators and linings) and the piston seals without disturbing the wheel or the main structural part of the brake.

The above and other objects of this invention will become apparent from the following description of the landing gear taken in connection with the accompanying drawings which form a part of this disclosure and in which:

FIGURE 1 is a plan view of one of the landing gears looking down on it from a location in the airplane; and FIGURE 2 is a sectional view taken substantially along line 2—2 of FIGURE 1.

Referring to FIGURE 1, it will be seen that the numeral 10 designates a landing gear comprising a strut 12, a pair of diametrically opposite hollow axles 14 and 16 suitably connected to and extending from the strut, and a pair of hollow cylindrical wheels 18 and 20 which are mounted to axles 14 and 16, respectively, in a manner hereinafter described. A pair of tires 22 and 24 is mounted to each of the wheels.

Since both dual tire wheel and brake assemblies are identical, the following description relating to the assembly shown in FIGURE 2 will be applicable to both.

It will be noted in FIGURE 2 that the hollow cylindrical wheel 18 is connected through suitable means, such as a plurality of bolts 26, to a wheel support drum 28 which surrounds axle 14, and that oppositely tapered bearings 30 and 32 are located between the support drum and axle for permitting rotation of the drum and wheel with respect to the axle. Removable inner annular tire retaining flanges 34 and 36 are maintained in position by being urged by the tires into abutment with shoulders 38 and 40, respectively. Removable outer annular tire retaining flanges 42 and 44 are maintained in position by snap rings 46 and 48. A brake mechanism indicated generally by the numeral 50 is centrally located within the hollow cylindrical wheel 18 and is suitably connected to the axle in a manner hereinafter described in more detail.

The brake which is illustrated is of the disc type and includes a plurality of interleaved rotors 52 which are splined to and are rotated by the wheel 18, and stators 54 which are splined to torque tube 56. Both the rotors and stators are movable axially and are sometimes referred to as a brake "stack." It is the frictional engagement of these relatively rotatable rotors and stators which produces the desired braking action on the aircraft wheel. Located within the torque tube 56 at the axis of rotation of the wheel is a nonrotatable hydraulic cylinder 58 which is connected to the end of the axle 14 along with the torque tube by suitable means such as a plurality of bolts 60. Located within the bore 62 of the cylinder is a piston mechanism 64 which has the right side thereof pressurized by hydraulic fluid from a pressure source (not shown) which flows through passage 66. A bleeder 67 is located in the passage for bleeding the hydraulic system. A pull rod 68 has one end thereof connected to the piston through means of a nut 70 and the other end thereof connected to a pressure plate 72 through means of a nut 74. A backing plate 76, which is located on the other end of the brake stack, abuts a plurality of insulator blocks 78. Located within the cylinder bore is a spring 80 for returning the piston, pull rod and pressure plate to a nonactuating position. A plurality of holes 82 are located around the periphery of the hollow cylindrical wheel 18 and between the tires 22 and 24 for ventilating and cooling the brake mechanism 50.

From the foregoing it will be understood that the wheel 18 with both tires 22 and 24 can be removed from the axle without disturbing the bearings 30 and 32 and without disturbing the brake mechanism 50 simply by removing bolts 26. Furthermore, since the wheel is provided with individually removable annular tire flanges, either tire can be changed without disturbing the remaining tire. By utilizing a centrally located brake mechanism of the type described which is located within the wheel and is mounted to the axle, it is possible to accomplish brake actuation by piping hydraulic fluid through the axle to the centrally located hydraulic piston. This type of an arrangement permits servicing of the heat sink components (rotors, stators and linings) without disturbing the wheel or the main structural part of the brake. This can be accomplished simply by removing nut 74 and pressure plate 72 through the end of the wheel. If the piston seals within the hydraulic cylinder 58 require servicing, this may be accomplished by removing end plug 84.

The several advantages which flow from this unique arrangement are believed to be obvious from the above description, and other advantages may suggest themselves to those who are familiar with the art to which this invention relates.

Furthermore, although this invention has been described in connection with a specific embodiment, it will be obvious to those skilled in the art that various changes may be made in the form, structure, and arrangement of parts without departing from the spirit of the invention.

Accordingly, I do not desire to be limited to the specific embodiment disclosed herein primarily for purposes of illustration, but instead desire protection falling within the scope of the appended claims.

Having thus described the various features of the invention, what I claim as new and desire to secure by Letters Patent is:

1. An aircraft landing gear comprising a strut, an axle operatively connected to and extending from said strut, a wheel support drum surrounding said axle, bearing means located between said support drum and said axle for permitting rotation of said drum with respect to said axle, a hollow cylindrical wheel for mounting a pair of tires, means for removably securing said wheel to said drum, annular flanges operatively connected to said wheel for retaining said tires on said wheel, and a brake mechanism located within said hollow cylindrical wheel and mounted to the outer end of said axle, said brake mechanism including nonrotatable braking elements connected to said axle, rotatable braking elements connected to said wheel, and actuating means for causing frictional engagement between said rotatable and nonrotatable braking elements.

2. An aircraft landing gear, as defined in claim 1, wherein said means for removably securing said wheel to said drum includes a plurality of bolts for connecting the inner periphery of said wheel to the outer periphery of said drum, the removal of which permits said hollow cylindrical wheel to be removed from said axle without disturbing said bearing means and said brake mechanism.

3. An aircraft landing gear, as defined in claim 2, wherein the nonrotatable braking elements of said brake mechanism include a torque tube mounted to the outer end of said axle and a plurality of stators operatively connected to and axially moxable on said torque tube, and the rotatable braking elements of said brake mechanism include a plurality of rotors operatively connected to and axially movable within said wheel, said stators and rotors being interleaved.

4. An aircraft landing gear, as defined in claim 3, wherein the actuating means of said brake mechanism includes a nonrotatable hydraulic cylinder member mounted to said axle and located within said torque tube at the axis of rotation of said wheel, said cylinder member having a bore therein, piston means slidably received in said bore, a pull rod connected to said piston means and movable therewith, a transverse pressure plate secured to said pull rod and movable therewith to force the rotors and stators into frictional engagement, and spring means located in said bore for urging said piston means, rod and pressure plate to a non-actuating position.

5. An aircraft landing gear, as defined in claim 4, wherein said pressure plate is removably secured to said pull rod so that removal of said pressure plate will permit removal of said rotors and stators without disturbing the wheel or other components of said brake mechanism.

6. An aircraft landing gear, as defined in claim 5, wherein said hydraulic cylinder member includes a removable end plug which permits replacement of piston seals in said cylinder bore after removal of said pressure plate.

References Cited
UNITED STATES PATENTS

| | | | |
|---|---|---|---|
| 2,905,505 | 9/1959 | Delker et al. | 301—36 |
| 3,009,742 | 11/1961 | Rabe et al. | 301—36 X |
| 3,096,123 | 7/1963 | Thompsett | 301—36 |

MILTON BUCHLER, *Primary Examiner.*

P. E. SAUBERER, *Assistant Examiner.*